United States Patent [19]
Yamaguchi

[11] Patent Number: 5,505,787
[45] Date of Patent: Apr. 9, 1996

[54] METHOD FOR CLEANING SURFACE OF EXTERNAL WALL OF BUILDING

[75] Inventor: Kyouichi Yamaguchi, Tokyo, Japan

[73] Assignee: Total Service Co., Inc., Tokyo, Japan

[21] Appl. No.: 187,848

[22] Filed: Jan. 28, 1994

[30] Foreign Application Priority Data

Feb. 1, 1993 [JP] Japan ......................... 1-014992

[51] Int. Cl.$^6$ ...................................... B08B 7/00
[52] U.S. Cl. .................. 134/4; 134/6; 134/7; 134/26; 134/42
[58] Field of Search .................. 134/4, 6, 7, 42, 134/26; 427/154, 155, 156

[56] References Cited

U.S. PATENT DOCUMENTS

| | | | |
|---|---|---|---|
| 2,495,729 | 1/1950 | Hutson et al. | 134/4 |
| 3,583,932 | 6/1971 | Benton et al. | 427/155 |
| 3,950,185 | 4/1976 | Toyama et al. | 134/4 |
| 4,586,962 | 5/1986 | Barabas | 134/4 |
| 4,613,378 | 9/1986 | Christy | 134/4 |
| 4,652,393 | 3/1987 | Ely et al. | 134/4 |
| 4,748,049 | 5/1988 | Charles et al. | 134/4 |
| 4,900,364 | 2/1990 | Diedrich | 134/4 |
| 5,030,290 | 7/1991 | Davis | 134/4 |

FOREIGN PATENT DOCUMENTS

| | | | |
|---|---|---|---|
| 0150474 | 11/1981 | Japan | 134/4 |
| 0189200 | 10/1984 | Japan | 134/4 |
| 0617410 | 7/1978 | U.S.S.R. | 134/4 |

*Primary Examiner*—Zeinab El-Arini
*Attorney, Agent, or Firm*—Webb Ziesenheim Bruening Logsdon Orkin & Hanson

[57] ABSTRACT

A method for cleaning a surface of an external wall of a building includes applying a cleaning fluid containing a strippable film forming agent to the surface of an external wall of a building, drying the applied cleaning fluid to form a strippable film, and stripping the strippable film from the surface of the external wall. Thus, the cleaning fluid which contains soil is removed with the strippable film, so that the scattering of the cleaning fluid around the building can be prevented.

9 Claims, 1 Drawing Sheet

001# METHOD FOR CLEANING SURFACE OF EXTERNAL WALL OF BUILDING

BACKGROUND OF THE INVENTION

The present invention relates to a method for cleaning the surface of an external wall of a building. More particularly, the present invention relates to a method for cleaning the surface of an external wall of a building with a cleaning fluid, in which the scattering of the cleaning fluid containing soil around he building is prevented.

The surface of the external wall of the building is exposed to the air, so that soil is deposited and gradually heaped up on the external wall surface due to the dust contained in the air, exhaust gas, etc. Consequently, periodic cleaning of the external wall surface is desired.

Among various conventional methods for cleaning the surface of such an external wall, the method is generally known in which a worker on a gondola 2 or the like connected to an upper end of a liftable arm wrist 1 as shown in FIG. 2 or suspended from the top of a building applies a liquid cleaning agent (cleaning fluid) to the surface of an external wall 3 of a building to be cleaned through a nozzle 4 or the like, and in which after some time, the surface of the external wall 3 having the cleaning fluid applied thereto is washed with water 5 by jetting the same thereonto through the nozzle 4 or the like, as shown in FIG. 3, to thereby remove soil 6 deposited on the surface of the external wall 3 as shown in the figure.

However, in the above conventional method, there has been a drawback in that, in the washing, the cleaning fluid 7 containing soil is blown and scattered around the building by the water 5 having been jetted toward and collided against the surface of the external wall 3, so that the foul cleaning fluid 7 soils neighboring buildings and trees and flows into sewerage.

Therefore, actually, the area where the cleaning operation can be performed according to the above conventional method, is very limited.

SUMMARY OF THE INVENTION

In view of the above situation, it is an object of the present invention to provide a method for cleaning the surface of an external wall of a building, devised to minimize the scattering of a cleaning fluid containing soil around the building at the time of cleaning the external wall surface with a cleaning fluid.

In order to attain the above object, the method for cleaning the surface of an external wall of a building according to the present invention comprises applying a cleaning fluid containing a strippable film forming agent to the surface of an external wall of a building, drying the applied cleaning fluid to form a strippable film, and stripping the strippable film from the external wall surface.

In this method, any soil deposited on the surface of the external wall of the building is detached by the cleaning action of the cleaning fluid, and the cleaning fluid containing the soil can be removed as the strippable film. This method is advantageous in that the scattering of the cleaning fluid containing the soil can be prevented.

Recently, for buildings, a fluororesin coating is applied to the surface of the external wall in order to avoid strong sticking of dust thereto, etc. The external wall surface coated with a fluororesin ensures excellent strippability, so that the method for cleaning the surface of an external wall of a building according to the present invention is particularly suitable for cleaning of the external wall surface coated with a fluororesin.

DESCRIPTION OF THE PREFERRED EMBODIMENTS

Hereinbelow, the method for cleaning the surface of an external wall of a building according to the present invention will be described in greater detail, referring to FIGS. 1 and 2.

The method for cleaning the surface of an external wall of a building according to the present invention comprises a step (1) of applying a cleaning fluid containing a strippable film forming agent to the surface of an external wall of a building and drying the applied cleaning fluid to form a strippable film, and a step (2) of stripping the strippable film formed in the step (1) from the external wall surface.

Figure 1A:
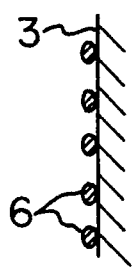
FIGS. 1(a) to (d) are views illustrating sequential steps of the method for cleaning the surface of an external wall of a building according to the present invention.
Figure 1B:
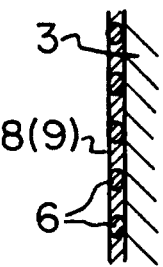
Figure 2:
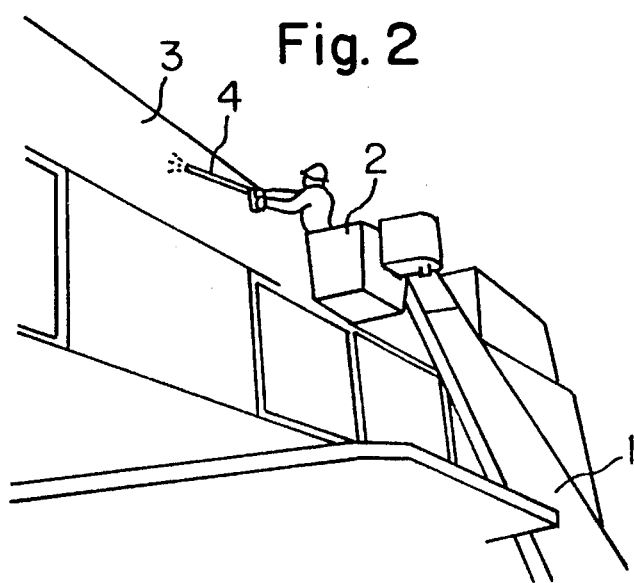
FIG. 2 is a view showing one scene of working for cleaning the surface of an external wall of a building.
Figure 3:
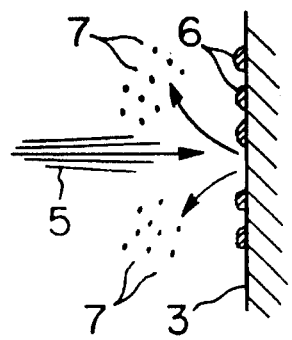
FIG. 3 is a view for explaining the conventional method for cleaning the surface of an external wall of a building.

In the above step (1) of the cleaning method of the present invention, the surface of the external wall 3 of the building having soil 6 deposited thereon as illustrated in FIG. 1(a) is covered with the cleaning fluid 8 by any coating technique, such as brushing or spraying, as illustrated in FIG. 1(b). The soil 6 deposited on the surface of the external wall 3 of the building is detached by the cleaning action of the cleaning fluid 8, which is then captured into the cleaning fluid 8. This cleaning fluid 8 is dried to obtain a strippable film 9.

Figure 1C:
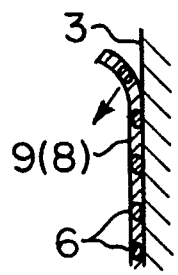
Figure 1D:

Subsequently, in the step (2), the strippable film 9 having the soil captured thereinto is stripped from the surface of the external wall 3 of the building, as illustrated in FIG. 1(c). Thus, the surface of the external wall 3 of the building having the soil 6 removed (cleaned surface) as illustrated in FIG. 1(d) results.

In the present invention, the cleaning fluid containing a strippable film forming agent is used in the step (1).

Generally, the cleaning of the surface of the external wall of the building is conducted by the use of an aqueous cleaning fluid. In the present invention as well, an aqueous cleaning fluid is generally employed.

When the aqueous cleaning fluid is used in the present invention, at least one water soluble polymer is used as the strippable film forming agent contained in the cleaning fluid.

Examples of water soluble polymers used as the strippable film forming agent in the aqueous cleaning fluid include water soluble natural polymers, such as gelatin, casein, albumin, starch, dextrin, alginate salts, gum arabic, pectin and gluten; and water soluble synthetic polymers, such as carboxymethylcellulose, methylcellulose, ethylcellulose, hydroxyethylcellulose, polyvinyl alcohol, polyacrylamide, polyvinyl pyrrolidone, polyethylene oxide and polyethylene glycol. From the viewpoint of cost, gelatin, casein, starch, dextrin, alginate salts, pectin, gluten, carboxymethylcellulose, methylcellulose, ethylcellulose, hydroxyethylcellulose, polyvinyl alcohol, polyacrylamide, polyethylene oxide and polyethylene glycol, are preferred. Of these, gelatin, pectin, carboxymethylcellulose and polyvinyl alcohol are especially preferred from the viewpoint of strippability and cost.

When the strippability of the strippable film formed from the above aqueous cleaning fluid on the surface of the external wall of the building is poor, a release agent is added to the aqueous cleaning fluid.

As such a release agent, conventional mold release agents applied to the inner surfaces of metal molds, such as paraffins, waxes and silicone oil, are used in small amounts.

In order to impart excellent chemical detergency to the aqueous cleaning fluid, an anionic, a cationic or a nonionic surfactant may be added to the aqueous cleaning fluid. The type of the surfactant employed is selected depending on the kinds of the material composing the external wall of the building and the soil deposited on the external wall.

Other additives such as acids or alkalis may be incorporated in the aqueous cleaning fluid, depending on the properties of the material composing the external wall of the building and the type of the soil deposited on the surface of the external wall.

Actually, a large variety of materials, such as stainless steel, aluminum, glass, cement, brick and marble, are employed to compose an external wall of a building. Depending on the properties of each of these materials, an appropriate strippable film forming agent, together with, if desired, other components, such as a release agent, a surfactant, an acid and an alkali, is selected. Further, for preventing the cleaning fluid from corroding the external wall material, appropriate components of the cleaning fluid should be selected depending on the properties of the external wall material.

The type of the soil deposited on an external wall of a building varies depending on in what environment the building is erected. For example, on the external wall of a building adjacent to an unpaved road, the main cause of the soil is deposited dust. On the other hand, on the external wall of a building adjacent to a road on which the automobile traffic is heavy, the main cause of the soil is deposits from automobile exhaust gas. Accordingly, an appropriate strippable film forming agent, together with, if desired, other components, such as a release agent, a surfactant, an acid or an alkali, is selected depending on the type of the soil as mentioned above.

The strippable film forming agent is generally contained in the cleaning fluid in an amount of 1 to 50% by weight, preferably 10 to 30% by weight.

The amount of each of other components of the cleaning fluid, such as a release agent, a surfactant, an acid and an alkali, is appropriately determined depending on the strippability of the strippable film, the level of the soil on the surface of the external wall of the building, etc., provided that, including these components, the solid content of the cleaning fluid generally does not exceed 50% by weight.

The cleaning fluid may contain a water-miscible organic solvent having a boiling point lower than that of water, such as an alcohol, for example, for improving the dryability of the strippable film.

In the above step (1), the cleaning fluid is applied to the surface of an external wall of a building by, for example, brushing or spraying, and dried by allowing it to stand in natural environment for a while or by, if necessary, heating. As a result, a strippable film is formed on the surface of the external wall of the building.

Subsequently, the step (2) of stripping the strippable film from the surface of the external wall of the building is carried out in the present invention.

One mode of the cleaning operation conducted in accordance with the method for cleaning the surface of an external wall of a building comprising the above steps (1) and (2) according to the present invention, will now be described with reference to FIG. 2.

First, for example, a gondola 2 connected to an upper end of a liftable arm wrist 1 is arranged so as to be liftable along the surface of an external wall 3 of a building to be cleaned.

This gondola 2 is provided with a cleaning fluid vessel having a cleaning fluid accommodated therein, a spray gun connected to the cleaning fluid vessel, capable of spraying the cleaning fluid by manual operation, and a brush.

Generally, a worker rides the above gondola 2 provided with the cleaning fluid vessel having a cleaning fluid accommodated therein, the spray gun and the brush, lifts the gondola 2 along the surface of the external wall 3 of the building to be cleaned, and then lowers the gondola 2 from the top of the building while performing the cleaning of the surface of the external wall 3 of the building.

The worker directs the head of a nozzle 4 of the spray gun toward the surface of the external wall 3 of the building to be cleaned, and blows the cleaning fluid onto the external wall surface through the head of the nozzle 4 by operating the spray gun to thereby have the surface of the external wall 3 coated with the cleaning fluid 8 as shown in FIG. 1(b). This cleaning fluid 8 is subjected to natural drying for a while to thereby obtain a strippable film 9.

Thereafter, the surface of the external wall 3 having the strippable film 9 formed thereon is brushed by the worker to strip the strippable film 9 from the external wall surface, as illustrated in FIG. 1(c). Thus, cleaning of the surface of the external wall 3 of the building is accomplished.

When there are places where the strippable film 9 is retained on the surface of the external wall 3 of the building without being stripped off, the places are washed with water with the use of the brush.

What is claimed is:

1. A method for cleaning dirt from a surface of an external wall of a building, comprising the steps of applying an aqueous cleaning fluid having a solid content including a strippable film forming agent and a surfactant to the surface of the external wall of the building; drying the cleaning fluid applied to the external wall to form a strippable film; and stripping the strippable film from the surface of the external wall to remove the dirt from the surface of the external wall captured by the strippable film, wherein said strippable film forming agent consists essentially of a water soluble polymer selected from the group consisting of water soluble natural polymer and a water soluble synthetic polymer, wherein said water soluble natural polymer is selected from the group consisting of gelatin, casein, albumin, starch, dextrin, alginate salts, gum arabic, pectin and gluten, and wherein said water soluble synthetic polymer is selected from the group consisting of carboxymethylcellulose, methylcellulose, ethylcellulose, hydroxyethylcellulose, polyvinyl alcohol, polyacrylamide, polyvinyl pyrrolidone, polyethylene oxide and polyethylene glycol.

2. The method for cleaning as claimed in claim 1, wherein said solid content is contained in said cleaning fluid in an amount of approximately 10 to 30% by weight.

3. The method for cleaning as claimed in claim 1, wherein said solid content is contained in said cleaning fluid in an amount of approximately 1 to 50% by weight.

4. The method for cleaning as claimed in claim 1, wherein said strippable film is stripped from the external wall surface by brushing.

5. The method for cleaning as claimed in claim 1, wherein said aqueous cleaning fluid further includes a release agent.

6. The method for cleaning as claimed in claim 1, wherein said aqueous cleaning fluid further includes an acid.

7. The method for cleaning as claimed in claim 1, wherein said aqueous cleaning fluid further includes an alkali.

8. The method for cleaning as claimed in claim 1, wherein said aqueous cleaning fluid further includes a water-miscible organic solvent having a boiling point lower than that of water.

9. A method for cleaning dirt from a surface of an external wall of a building, comprising the steps of:

applying an aqueous cleaning fluid to said external wall, said cleaning fluid having a solid content, said solid content including a strippable film forming agent and a surfactant, wherein said strippable film forming agent consists essentially of a water soluble polymer selected from the group consisting of a water soluble natural polymer and a water soluble polymer, wherein said water soluble natural polymer is selected from the group consisting of gelatin, casein, albumin, starch, dextrin, alginate salts, gum arabic, pectin and gluten and wherein said water soluble synthetic polymer is selected from the group consisting of carboxymethylcellulose, methylcellulose, ethylcellulose, hydroxyethylcellulose, polyvinyl alcohol, polyacrylamide, polyvinyl pyrrolidone, polyethylene oxide and polyethylene glycol and wherein a total weight percent of said solid content is approximately 1 to 50%;

drying said cleaning fluid applied to the external wall to form a strippable film;

brushing the strippable film from the surface of the external wall to remove the dirt from the surface of the external wall captured by the strippable film; and washing the external wall with water.

* * * * *

UNITED STATES PATENT AND TRADEMARK OFFICE
CERTIFICATE OF CORRECTION

PATENT NO. : 5,505,787
DATED : April 9, 1996
INVENTOR(S) : Kyouichi Yamaguchi

It is certified that error appears in the above-indentified patent and that said Letters Patent is hereby corrected as shown below:

Title page, item '[30] Foreign Application Priority Data', "1-014992" should read --5-014992--.

Claim 1 Line 49 Column 4 "consisting of water" should read --consisting of a water--.

Claim 9 Line 19 Column 5 "soluble polymer," should read --soluble synthetic polymer,--.

Claim 9 Line 3 Column 6 after "gluten" insert --,--.

Signed and Sealed this

Seventeenth Day of September, 1996

Attest:

BRUCE LEHMAN

*Attesting Officer*  *Commissioner of Patents and Trademarks*